(12) United States Patent
LiPiShan et al.

(10) Patent No.: US 9,243,173 B2
(45) Date of Patent: Jan. 26, 2016

(54) POLYOLEFIN ADHESIVE COMPOSITION

(71) Applicants: Colin LiPiShan, Pearland, TX (US); Cynthia L. Rickey, Lake Jackson, TX (US); Alec Y. Wang, Lake Jackson, TX (US)

(72) Inventors: Colin LiPiShan, Pearland, TX (US); Cynthia L. Rickey, Lake Jackson, TX (US); Alec Y. Wang, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/379,584

(22) PCT Filed: Feb. 27, 2013

(86) PCT No.: PCT/US2013/027919
§ 371 (c)(1),
(2) Date: Aug. 19, 2014

(87) PCT Pub. No.: WO2013/148041
PCT Pub. Date: Oct. 3, 2013

(65) Prior Publication Data
US 2015/0065638 A1    Mar. 5, 2015

Related U.S. Application Data

(60) Provisional application No. 61/618,062, filed on Mar. 30, 2012.

(51) Int. Cl.
*A61K 9/16*    (2006.01)
*C08L 53/00*    (2006.01)
*C09J 153/00*    (2006.01)

(52) U.S. Cl.
CPC .................................. *C09J 153/00* (2013.01)

(58) Field of Classification Search
CPC ........................................................ C09J 153/00
USPC .......................................................... 524/543
See application file for complete search history.

(56) References Cited

U.S. PATENT DOCUMENTS

| | | |
|---|---|---|
| 5,272,236 A | 12/1993 | Lai et al. |
| 5,278,272 A | 1/1994 | Lai et al. |
| 5,986,028 A | 11/1999 | Lai et al. |
| 7,524,911 B2 | 4/2009 | Karjala et al. |
| 7,608,668 B2 | 10/2009 | Li Pi Shan et al. |
| 7,858,706 B2 | 12/2010 | Arriola et al. |
| 7,893,166 B2 | 2/2011 | Shan et al. |
| 7,947,793 B2 | 5/2011 | Marchand et al. |
| 7,989,543 B2 | 8/2011 | Karjala et al. |
| 8,378,015 B2 | 2/2013 | He et al. |
| 2006/0199897 A1 | 9/2006 | Karjala et al. |
| 2008/0081858 A1 | 4/2008 | Okazaki |
| 2010/0197880 A1 | 8/2010 | Shan et al. |
| 2011/0008567 A1 | 1/2011 | Weeks et al. |
| 2011/0021103 A1 | 1/2011 | Alper et al. |
| 2011/0262747 A1* | 10/2011 | Yalvac et al. ............ 428/355 EN |

FOREIGN PATENT DOCUMENTS

WO    2006102150 A2    9/2006

OTHER PUBLICATIONS

Zhou, Peiguang, and Neculescu, Cris, Development of Polyporpylene-Based Polyolefin Hot Melt Adhesive for Personal Care Product Applications, ip.com Journal, 6, 10A, 21 (2006).
PCT/US2013/027919 International Search Report and Written Opinion of the International Searching Authority, Apr. 10, 2013.
PCT/US2013/02719 International Preliminary Report on Patentability, Oct. 1, 2014.

* cited by examiner

*Primary Examiner* — Hui Chin

(57) ABSTRACT

The invention provides an adhesive formulation comprising an olefin block copolymer comprising hard blocks and soft blocks wherein the hard blocks comprise 4-8 mol % comonomer; and are present in an amount of 20 wt %-45 wt %. This formulation is particularly advantageous for use in hot melt adhesives but may be used in other applications as well.

7 Claims, 8 Drawing Sheets

POLYOLEFIN ADHESIVE COMPOSITION

FIELD OF THE INVENTION

This invention relates to polyolefin adhesive formulations comprising olefin block copolymers.

BACKGROUND OF THE INVENTION

An adhesive is a substance capable of holding solid materials (e.g., adherents or substrates) together by surface attachment. Pressure sensitive adhesives (PSAs) generally are adhesive materials which bond to adherents when a required pressure is applied to effect an adhesion to the adherents. PSAs can be permanent or removable. Removable PSAs have been widely used in re-positionable applications, such as post-it notes. Pressure sensitive adhesives are generally based on a polymer, a tackifier and an oil. Some common PSAs are based on polymers such as natural rubbers, synthetic rubbers (e.g., styrene-butadiene rubber (SBR) and SIS), polyacrylates, polymethacrylates, and poly-alpha-olefins. The PSAs can be solvent-based, water-based, or hot melt systems.

Hot-melt adhesives at ambient temperature are generally solid materials that can be heated to a melt to hold adherents or substrates together upon cooling and solidifying. In some applications, the bonded substrates can be detached by remelting the hot melt adhesive if the substrates can withstand the heat. The hot melt adhesives can be used in paper products, packaging materials, laminated wood panels, kitchen countertops, vehicles, tapes, labels, and a variety of disposable goods such as disposable diapers, hospital pads, feminine sanitary napkins, and surgical drapes. These hot melt adhesives are generally based on a polymer, tackifier, and a wax. Some common hot melt adhesives are based on polymer components including ethylene based semi-crystalline polymers such as ethylene-vinyl acetate copolymer (EVA) and linear low density polyethylene (LLDPE), styrene block copolymers (SBC) such as styrene-isoprene-styrene (SIS) copolymer and styrene-butadiene-styrene (SBS) copolymer, ethylene ethyl acrylate copolymers (EEA), and polyurethane reactive adhesives (PUR). One desirable property of hot melt adhesives is the absence of a liquid carrier, thereby eliminating the costly process associated with solvent removal.

Some compositions that contain a polymer, a tackifier and optionally at least a filler or a pigment may be used as thermoplastic marking compositions. The polymer can be a silane-modified petroleum resin, an ethylene-vinyl acetate copolymer, an atactic polypropylene; a carboxy-modified hydrocarbon resin, an ester-modified hydrocarbon resin, a polyolefin copolymer, or a combination thereof.

Olefin block copolymers (OBCs) have been found to be advantageous in a variety of adhesive applications such as described, for example, in U.S. Pat. No. 7,524,911 and U.S. Pat. No. 7,989,543 as well as in US Patent Application Publication No. 2011-0262747.

It would be desirable to provide further improved compositions wherein the compositions have an improved open time, where open time refers to the set up time of an adhesive, or the time it takes for the adhesive to solidify. Delays in the open time allows for increased time for adhesive wetting and bonding. The current market trend is to operate machinery at higher line speeds and at lower temperatures, so it would be desirable to be able to apply the adhesive at a lower temperature (100-120° C.) and still maintain the bonding performance required.

SUMMARY OF INVENTION

The invention provides an adhesive composition, or formulation, comprising: an olefin block copolymer comprising ethylene and an alpha-olefin comonomer wherein the olefin block copolymer comprises: hard blocks, wherein the hard blocks comprise 4-8 mol % comonomer; and wherein the hard blocks are present in an amount of 20 wt %-45 wt %, preferably 25 wt %-40 wt %, more preferably 30 wt % to 40 wt % by weight of the olefin block copolymer and, soft blocks, wherein the soft blocks comprise 10-14 mol % comonomer; wherein the olefin block copolymer has a Mw of 15,000 g/mol-100,000 g/mol, a total crystallinity of 5 wt %-30 wt %, preferably 10 wt % to 25 wt %, more preferably 15 wt % to 20 wt %, a Tm of 60° C. to 115° C., of 80° C. to 110° C., or of 90° C. to 105° C.; and, a Tc of 45° C. to 100° C., of 60° C. to 90° C. or of 70° C. to 80° C.; tackifier; and, oil. The invention additionally provides an article comprising the inventive adhesive composition, including but not limited to, non-woven structures.

DETAILED DESCRIPTION OF THE INVENTION

Figure 1:
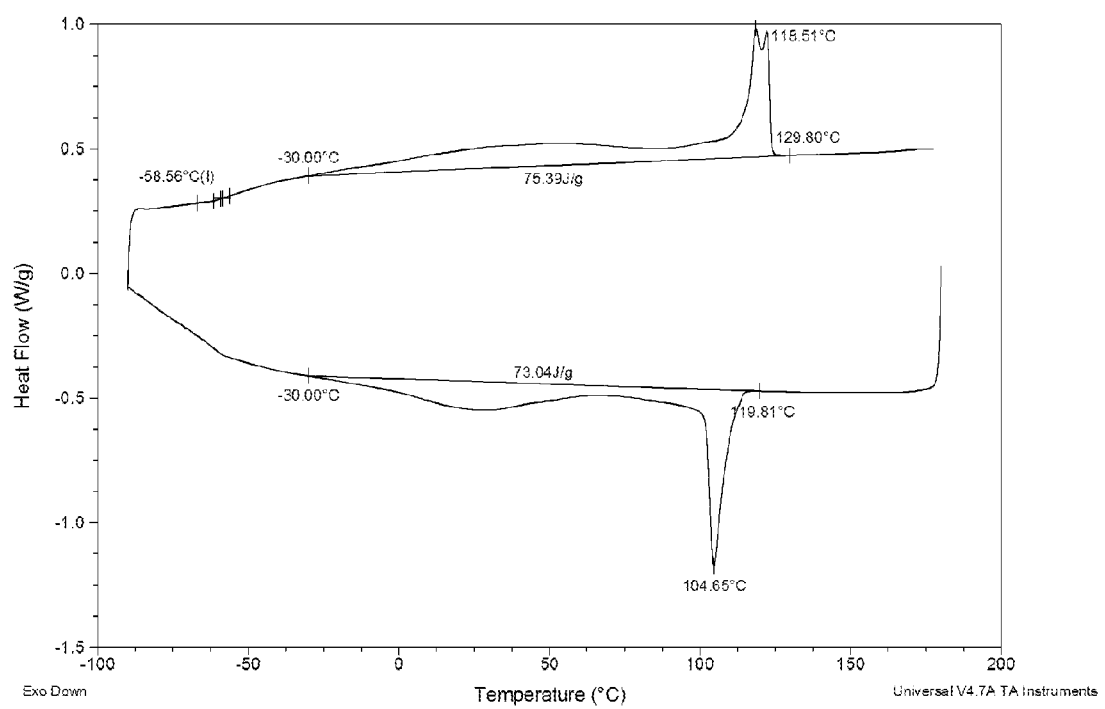
FIG. 1 shows the DSC profile of OBC A.

"Polymer" means a polymeric compound prepared by polymerizing monomers, whether of the same or a different type. The generic term "polymer" embraces the terms "homopolymer," "copolymer," "terpolymer" as well as "interpolymer." When referring to monomer content of a polymer it is understood that the reference is to polymerized units of such monomer.

"Interpolymer" means a polymer prepared by the polymerization of at least two different types of monomers. The generic term "interpolymer" includes the term "copolymer" (which is usually employed to refer to a polymer prepared from two different monomers) as well as the term "terpolymer" (which is usually employed to refer to a polymer prepared from three different types of monomers). It also encompasses polymers made by polymerizing four or more types of monomers.

The term "crystalline" if employed, refers to a polymer that possesses a first order transition or crystalline melting point (Tm) as determined by differential scanning calorimetry (DSC) or equivalent technique. The term may be used interchangeably with the term "semicrystalline". The term "amorphous" refers to a polymer lacking a crystalline melting point as determined by differential scanning calorimetric (DSC) or equivalent technique.

The term "total weight percent crystallinity" is measured by DSC as described below and is equal to 100*enthalpy of sample/enthalpy of polyethylene crystal where the enthalpy of a perfect polyethylene crystal is equal to 292 J/g as reported in Macromolelcular Physics, Vol. 1, Academic Press, New York, 1973, p. 154.

Olefin Block Copolymer

The term "olefin block copolymer" or "OBC" is an ethylene/α-olefin multi-block copolymer and includes ethylene and one or more copolymerizable α-olefin comonomer in polymerized form, characterized by multiple blocks or segments of two or more polymerized monomer units differing in chemical or physical properties. The terms "interpolymer" and "copolymer" are used interchangeably herein. In some embodiments, the multi-block copolymer can be represented by the following formula:

(AB)$_n$ where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked in a substantially linear fashion, as opposed to a substantially branched or substantially star-shaped fashion. In other embodiments, A blocks and B blocks are randomly distributed along the polymer chain. In other words, the block copolymers usually do not have a structure as follows.

AAA-AA-BBB-BB

In still other embodiments, the block copolymers do not usually have a third type of block, which comprises different comonomer(s). In yet other embodiments, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

Preferably, ethylene comprises the majority mole fraction of the whole block copolymer, i.e., ethylene comprises at least 50 mole percent of the whole polymer. More preferably ethylene comprises at least 60 mole percent, at least 70 mole percent, or at least 80 mole percent, with the substantial remainder of the whole polymer comprising at least one other comonomer that is preferably an α-olefin having 3 or more carbon atoms. For many ethylene/octene block copolymers, the preferred composition comprises an ethylene content greater than 80 mole percent of the whole polymer and an octene content of from 10 to 15, preferably from 15 to 20 mole percent of the whole polymer.

The olefin block copolymer includes various amounts of "hard" and "soft" segments. "Hard" segments are blocks of polymerized units in which ethylene is present in an amount of 92 mol % to 99 mol %, 96 mol % to 98 mol % or 95 mol % to 98 mol %. In other words, the comonomer content (content of monomers other than ethylene) in the hard segments is 1 mol % to 8 mol %, 2 mol % to 5 mol % or 2 mol % to 4 mol %. "Soft" segments are blocks of polymerized units in which the comonomer content (content of monomers other than ethylene) is 10 mol % to 15 mol %, 10 mol % to 13 mol % or 11 mol % to 12 mol %. In other words, the ethylene content is 85 mol % to 90 mol %, 86 mol % to 89 mol % or 87 mol % to 88 mol %. A difference of at least one half mole percent is statistically significant.

The hard segments can be present in the OBC in amounts of 20 wt %-45 wt %, preferably 25 wt % to 40 wt %, more preferably 30 wt % to 40 wt % by weight of the block copolymer, with soft segments comprising the remainder. The soft segment weight percentage and the hard segment weight percentage can be calculated based on data obtained from DSC or NMR, and mole percentages calculated therefrom. Such methods and calculations are disclosed in, for example, U.S. Pat. No. 7,608,668, entitled "Ethylene/α-Olefin Block Interpolymers," filed on Mar. 15, 2006, in the name of Colin L. P. Shan, Lonnie Hazlitt, et. al. and assigned to Dow Global Technologies Inc., the disclosure of which is incorporated by reference herein in its entirety. In particular, hard and soft segment weight percentages and comonomer content may be determined as described in Column 57 to Column 63 of U.S. Pat. No. 7,608,668.

The olefin block copolymer is a polymer comprising two or more chemically distinct regions or segments (referred to as "blocks") preferably joined in a linear manner, that is, a polymer comprising chemically differentiated units which are joined end-to-end with respect to polymerized ethylenic functionality, rather than in pendent or grafted fashion. In an embodiment, the blocks differ in the amount or type of incorporated comonomer, density, amount of crystallinity, crystallite size attributable to a polymer of such composition, type or degree of tacticity (isotactic or syndiotactic), region-regularity or regio-irregularity, amount of branching (including long chain branching or hyper-branching), homogeneity or any other chemical or physical property. Compared to block interpolymers of the prior art, including interpolymers produced by sequential monomer addition, fluxional catalysts, or anionic polymerization techniques, the present OBC is characterized by unique distributions of both polymer polydispersity (PDI or Mw/Mn or MWD), block length distribution, and/or block number distribution, due, in an embodiment, to the effect of the shuttling agent(s) in combination with multiple catalysts used in their preparation.

In an embodiment, the OBC is produced in a continuous process and possesses a polydispersity index, PDI, from 1.7 to 3.5, or from 1.8 to 3, or from 1.8 to 2.5, or from 1.8 to 2.2. When produced in a batch or semi-batch process, the OBC possesses PDI from 1.0 to 3.5, or from 1.3 to 3, or from 1.4 to 2.5, or from 1.4 to 2.

In addition, the olefin block copolymer possesses a PDI fitting a Schultz-Flory distribution rather than a Poisson distribution. The present OBC has both a polydisperse block distribution as well as a polydisperse distribution of block sizes. This results in the formation of polymer products having improved and distinguishable physical properties. The theoretical benefits of a polydisperse block distribution have been previously modeled and discussed in Potemkin, *Physical Review E* (1998) 57 (6), pp. 6902-6912, and Dobrynin, *J. Chem. Phys.* (1997) 107 (21), pp 9234-9238.

In an embodiment, the present olefin block copolymer possesses a most probable distribution of block lengths.

In an embodiment, the olefin block copolymer is defined as having:

(A) a molecular fraction which elutes between 40° C. and 130° C. when fractionated using TREF, characterized in that the fraction has a block index of at least 0.5 and up to 1 and a molecular weight distribution, Mw/Mn, greater than 1.3; and/or (B) average block index greater than zero and up to 1.0 and a molecular weight distribution, Mw/Mn greater than 1.3. Block Index can be determined as described in detail in U.S. Pat. No. 7,608,668 herein incorporated by reference for that purpose. Analytical methods for determining properties (A) through (B) are disclosed in, for example, U.S. Pat. No. 7,608,668, Col. 31, line 26 through Col. 35, line 44, which is herein incorporated by reference for that purpose.

Suitable monomers for use in preparing the present OBC include ethylene and one or more addition polymerizable monomers other than ethylene. Examples of suitable comonomers include straight-chain or branched α-olefins of 3 to 30, preferably 3 to 20, carbon atoms, such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; cyclo-olefins of 3 to 30, preferably 3 to 20, carbon atoms, such as cyclopentene, cycloheptene, norbornene, 5-methyl-2-norbornene, tetracyclododecene, and 2-methyl-1,2,3,4,4a,5,8,8a-octahydronaphthalene; di- and polyolefins, such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidenenorbornene, vinyl norbornene, dicyclopentadiene, 7-methyl-1,6-octadiene, 4-ethylidene-8-methyl-1,7-nonadiene, and 5,9-dimethyl-1,4,8-decatriene; and 3-phenylpropene, 4-phenylpropene, 1,2-difluoroethylene, tetrafluoroethylene, and 3,3,3-trifluoro-1-propene.

The olefin block copolymer has a density of from 0.850 g/cc to 0.880 g/cc, or from 0.850 g/cc to 0.879 g/cc. In an embodiment, the olefin block copolymer has a melt index (MI) from 5 g/10 min to 1000 g/10, or from 15 g/10 min to 50 g/10 min, or from 20 g/10 min to 40 g/10 min, as measured by ASTM D 1238 (190° C./2.16 kg). The olefin block copolymer is present in an amount of 10 wt % to 45 wt %, preferably 15 wt % to 40 wt %, more preferably 20 wt % to 35 wt %, based on total weight of formulation. The olefin block copolymer has an Mw of 15,000 to 100,000 g/mol or preferably of 20,000 to 75,000. The olefin block copolymer has a Tm as measured by DSC of 60° C. to 115° C., of 80° C. to 110° C., or of 90° C. to 105° C. The olefin block copolymer also has a Tc as measured by DSC of 45° C. to 100° C., of 60° C. to 90° C. or of 70° C. to 80° C. In some embodiments, the total crystallinity of the olefin block copolymers is 5 wt %-30 wt %, preferably 10 wt % to 25 wt %, more preferably 15 wt % to 20 wt %.

The olefin block copolymers are produced via a chain shuttling process such as described in U.S. Pat. No. 7,858,706, which is herein incorporated by reference. In particular, suitable chain shuttling agents and related information are listed in Col. 16, line 39 through Col. 19, line 44. Suitable catalysts are described in Col. 19, line 45 through Col. 46, line 19 and suitable co-catalysts in Col. 46, line 20 through Col. 51 line 28. The process is described throughout the document, but particularly in Col. Col 51, line 29 through Col. 54, line 56. The process is also described, for example, in the following: U.S. Pat. No. 7,608,668; U.S. Pat. No. 7,893,166; and U.S. Pat. No. 7,947,793 as well as US Patent Application Publication No. 2010-0197880.

Tackifier

The compositions disclosed herein comprise a tackifier or tackifying resin or tackifier resin. The tackifier may modify the properties of the composition such as viscoelastic properties (e.g., tan delta), rheological properties (e.g., viscosity), tackiness (i.e., ability to stick), pressure sensitivity, and wetting property. In some embodiments, the tackifier is used to improve the tackiness of the composition. In other embodiments, the tackifier is used to reduce the viscosity of the composition. In further embodiments, the tackifier is used to render the composition a pressure-sensitive adhesive. In particular embodiments, the tackifier is used to wet out adherent surfaces and/or improve the adhesion to the adherent surfaces.

Any tackifier known to a person of ordinary skill in the art may be used in the adhesion composition disclosed herein. Tackifiers suitable for the compositions disclosed herein can be solids, semi-solids, or liquids at room temperature. Non-limiting examples of tackifiers include (1) natural and modified rosins (e.g., gum rosin, wood rosin, tall oil rosin, distilled rosin, hydrogenated rosin, dimerized rosin, and polymerized rosin); (2) glycerol and pentaerythritol esters of natural and modified rosins (e.g., the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin); (3) copolymers and terpolymers of natured terpenes (e.g., styrene/terpene and alpha methyl styrene/terpene); (4) polyterpene resins and hydrogenated polyterpene resins; (5) phenolic modified terpene resins and hydrogenated derivatives thereof (e.g., the resin product resulting from the condensation, in an acidic medium, of a bicyclic terpene and a phenol); (6) aliphatic or cycloaliphatic hydrocarbon resins and the hydrogenated derivatives thereof (e.g., resins resulting from the polymerization of monomers consisting primarily of olefins and diolefins); (7) aromatic hydrocarbon resins and the hydrogenated derivatives thereof; (8) aromatic modified aliphatic or cycloaliphatic hydrocarbon resins and the hydrogenated derivatives thereof; and combinations thereof. The amount of the tackifier in the composition can be present in an amount of 30 wt % to 70 wt %, 35 wt % to 65 wt %, or 40 to 60 wt % of the total weight of the composition.

In other embodiments, the tackifiers include rosin-based tackifiers (e.g. AQUATAC® 9027, AQUATAC® 4188, SYLVALITE®, SYLVATAC® and SYLVAGUM® rosin esters from Arizona Chemical, Jacksonville, Fla.). In other embodiments, the tackifiers include polyterpenes or terpene resins (e.g., SYLVARES® terpene resins from Arizona Chemical, Jacksonville, Fla.). In other embodiments, the tackifiers include aliphatic hydrocarbon resins such as resins resulting from the polymerization of monomers consisting of olefins and diolefins (e.g., ESCOREZ® 1310LC, ESCOREZ® 2596 from ExxonMobil Chemical Company, Houston, Tex.) and the hydrogenated derivatives thereof; alicyclic petroleum hydrocarbon resins and the hydrogenated derivatives thereof (e.g. ESCOREZ® 5300 and 5400 series from ExxonMobil Chemical Company; EASTOTAC® resins from Eastman Chemical, Kingsport, Tenn.). In further embodiments, the tackifiers are modified with tackifier modifiers including aromatic compounds (e.g., ESCOREZ® 2596 from ExxonMobil Chemical Company.) and low softening point resins (e.g., AQUATAC 5527 from Arizona Chemical, Jacksonville, Fla.). In some embodiments, the tackifier is an aliphatic hydrocarbon resin having at least five carbon atoms. In other embodiments, the tackifier has a Ring and Ball (R&B) softening point equal to or greater than 80° C. The Ring and Ball (R&B) softening point can be measured by the method described in ASTM E28, which is incorporated herein by reference.

Oil

In further embodiments, the compositions disclosed herein optionally can comprise a plasticizer or plasticizing oil or an extender oil that may reduce viscosity and/or improve tack properties. Any plasticizer known to a person of ordinary skill in the art may be used in the adhesion composition disclosed herein. Non-limiting examples of plasticizers include olefin oligomers, low molecular weight polyolefins such as liquid polybutene, phthalates, mineral oils such as naphthenic, paraffinic, or hydrogenated (white) oils (e.g. Kaydol oil), vegetable and animal oil and their derivatives, petroleum derived oils, and combinations thereof. In some embodiments, the plasticizers include polypropylene, polybutene, hydrogenated polyisoprene, hydrogenated polybutadiene, polypiperylene and copolymers of piperylene and isoprene, and the like having average molecular weights between about 350 and about 10,000. In other embodiments, the plasticizers include glyceryl esters of the usual fatty acids and polymerization products thereof.

In some embodiments, a suitable insoluble plasticizer may be selected from the group which includes dipropylene glycol dibenzoate, pentaerythritol tetrabenzoate; polyethylene glycol 400-di-2-ethylhexoate; 2-ethylhexyl diphenyl phsophate;

butyl benzyl phthalate, dibutyl phthalate, dioctyl phthalate, various substituted citrates, and glycerates. Suitable dipropylene glycol dibenzoate and pentaerythritol tetrabenzoate may be purchased from Velsicol Chemical Company of Chicago, Ill. under the trade designations "Benzoflex 9-88 and S-552", respectively. Further, a suitable polyethylene glycol 400-di-2-ethylhexoate may be purchased from C.P. Hall Company of Chicago, Ill. under the trade designation "Tegmer 809". A suitable 2-ethylhexyl diphenyl phosphate, and a butyl benzyl phthalate may be purchased from Monsanto Industrial Chemical Company of St. Louis, Mo. under the trade designation "Santicizer 141 and 160", respectively. When Benzoflex is used as a plasticizer in an adhesive composition, it can delay the crystallization in diaper core stabilization adhesives, which are used to stabilize the thinner cores of diapers and adult incontinence products.

In an embodiment, the inventive formulation contains 10 wt % to 40 wt % oil, or 15 wt % to 30 wt % oil, based on the total weight of the formulation.

Other Polyolefin

A homogeneously branched ethylene/alpha-olefin copolymers can also be added to the formulation. These copolymers can be made with a single-site catalyst, including, but not limited to, a metallocene catalyst or constrained geometry catalyst, and typically have a melting point of less than 105, preferably less than 90, more preferably less than 85, even more preferably less than 80 and still more preferably less than 75° C. The melting point is measured by differential scanning calorimetry (DSC) as described, for example, in U.S. Pat. No. 5,783,638. The α-olefin is preferably a $C_{3-20}$ linear, branched or cyclic α-olefin. Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins can also contain a cyclic structure such as cyclohexane or cyclopentane, resulting in an α-olefin such as 3-cyclohexyl-1-propene (allyl cyclohexane) and vinyl cyclohexane. Although not α-olefins in the classical sense of the term, for purposes of this invention certain cyclic olefins, such as norbornene and related olefins, are α-olefins and can be used in place of some or all of the α-olefins described above. Similarly, styrene and its related olefins (for example, α-methylstyrene, etc.) are α-olefins for purposes of this invention. Illustrative homogeneously branched ethylene/alpha-olefin copolymers include ethylene/propylene, ethylene/butene, ethylene/1-hexene, ethylene/1-octene, ethylene/styrene, and the like. Illustrative terpolymers include ethylene/propylene/1-octene, ethylene/propylene/butene, ethylene/butene/1-octene, and ethylene/butene/styrene. The copolymers can be random or blocky.

More specific examples of homogeneously branched ethylene/alpha-olefin interpolymers useful in this invention include homogeneously branched, linear ethylene/α-olefin copolymers (e.g. TAFMER® by Mitsui Petrochemicals Company Limited and EXACT® by Exxon Chemical Company), and the homogeneously branched, substantially linear ethylene/α-olefin polymers (e.g., AFFINITY™ plastomer and ENGAGE™ elastomer available from The Dow Chemical Company). The substantially linear ethylene copolymers are especially preferred, and are more fully described in U.S. Pat. Nos. 5,272,236, 5,278,272 and 5,986,028. Blends of any of these interpolymers can also be used in the practice of this invention. In the context of this invention, homogeneously branched ethylene/alpha-olefin interpolymers are not olefin block copolymers.

Other polyolefins that may be included are olefin block copolymers that are different in physical characteristics than those as described above.

Additives

In further embodiments, the compositions disclosed herein optionally can comprise a wax that may reduce the melt viscosity in addition to reducing costs. Any wax known to a person of ordinary skill in the art can be used in the adhesion composition disclosed herein. Non-limiting examples of suitable waxes include petroleum waxes, polyolefin waxes such as low molecular weight polyethylene or polypropylene, synthetic waxes, paraffin and microcrystalline waxes having melting points from about 55 to about 110° C., Fischer-Tropsch waxes and combinations thereof. In some embodiments, the wax is a low molecular weight polyethylene homopolymer or interpolymer having a number average molecular weight of about 400 to about 6,000 g/mole.

In further embodiments, the compositions disclosed herein optionally can comprise an antioxidant or a stabilizer. Any antioxidant known to a person of ordinary skill in the art may be used in the adhesion composition disclosed herein. Non-limiting examples of suitable antioxidants include amine-based antioxidants such as alkyl diphenylamines, phenyl-α-naphthylamine, alkyl or aralkyl substituted phenyl-α-naphthylamine, alkylated p-phenylene diamines, tetramethyl-diaminodiphenylamine and the like; and hindered phenol compounds such as 2,6-di-t-butyl-4-methylphenol; 1,3,5-trimethyl-2,4,6-tris(3',5'-di-t-butyl-4'-hydroxybenzyl)benzene; tetrakis[methylene(3,5-di-t-butyl-4-hydroxyhydrocinnamate)]methane (e.g., IRGANOX™ 1010, from Ciba Geigy, New York); octadecyl-3,5-di-t-butyl-4-hydroxycinnamate (e.g., IRGANOX™ 1076, commercially available from Ciba Geigy) and combinations thereof. Where used, the amount of the antioxidant in the composition can be from about greater than 0 to about 1 wt %, from about 0.05 to about 0.75 wt %, or from about 0.1 to about 0.5 wt % of the total weight of the composition.

In further embodiments, the compositions disclosed herein optionally can comprise an UV stabilizer that may prevent or reduce the degradation of the compositions by UV radiation. Any UV stabilizer known to a person of ordinary skill in the art may be used in the adhesion composition disclosed herein. Non-limiting examples of suitable UV stabilizers include benzophenones, benzotriazoles, aryl esters, oxanilides, acrylic esters, Formamidine carbon black, hindered amines, nickel quenchers, hindered amines, phenolic antioxidants, metallic salts, zinc compounds and combinations thereof. Where used, the amount of the UV stabilizer in the composition can be from about greater than 0 to about 1 wt %, from about 0.05 to about 0.75 wt %, or from about 0.1 to about 0.5 wt % of the total weight of the composition.

In further embodiments, the compositions disclosed herein optionally can comprise a colorant or pigment. Any colorant or pigment known to a person of ordinary skill in the art may be used in the adhesion composition disclosed herein. Non-limiting examples of suitable colorants or pigments include inorganic pigments such as titanium dioxide and carbon black, phthalocyanine pigments, and other organic pigments such as IRGAZIN®, CROMOPHTAL®, MONASTRAL®, CINQUASIA®, IRGALITE®, ORASOL®, all of which are available from Ciba Specialty Chemicals, Tarrytown, N.Y. Where used, the amount of the colorant or pigment in the composition can be from about greater than 0 to about 10 wt %, from about 0.1 to about 5 wt %, or from about 0.5 to about 2 wt % of the total weight of the composition.

In further embodiments, the compositions disclosed herein optionally can comprise a filler. Any filler known to a person of ordinary skill in the art may be used in the adhesion composition disclosed herein. Non-limiting examples of suitable fillers include sand, talc, dolomite, calcium carbonate, clay, silica, mica, wollastonite, feldspar, aluminum silicate, alumina, hydrated alumina, glass bead, glass microsphere, ceramic microsphere, thermoplastic microsphere, barite, wood flour, and combinations thereof.

Adhesive Composition or Formulation

The invention provides an adhesive composition, or formulation, comprising an olefin block copolymer, tackifier, oil and optionally another polyolefin. The formulation has a Complex Viscosity in the temperature range of 70° C. to 110° C. of 0 pa-s up to 500 pa-s, preferably of 0 pa-s to 400 pa-s. In addition, the formulation exhibits a cross-over temperature of between 70° C. to 95° C., wherein "cross-over temperature" is defined as the temperature at which the formulation has a Complex Viscosity that is greater than 500 pa-s.

Uses

The adhesives of the current invention may be used in a variety of adhesive applications, including, but not limited to pressure-sensitive adhesives and hot melt adhesives. The inventive adhesives are particularly useful in hot melt adhesives for applications, such as, but not limited to, non-woven fabrics and uses such as diaper, hygiene, and medical garment waistband applications, such as tabs and elastic bands and particularly as attachment adhesives.

The inventive adhesives exhibit improved wetting in non-woven applications resulting in better adhesion. The setup time of the adhesive can be tuned to balance the adhesion and blocking or strike-through of the nonwoven fabric.

Test Methods $^{13}$C NMR Analysis

The samples are prepared by adding approximately 3 g of a 50/50 mixture of tetrachloroethane-d$^2$/orthodichlorobenzene to 0.4 g sample in a 10 mm NMR tube. The samples are dissolved and homogenized by heating the tube and its contents to 150° C. The data are collected using a JEOL Eclipse™ 400 MHz spectrometer or a Varian Unity Plus™ 400 MHz spectrometer, corresponding to a $^{13}$C resonance frequency of 100.5 MHz. The data are acquired using 4000 transients per data file with a 6 second pulse repetition delay. To achieve minimum signal-to-noise for quantitative analysis, multiple data files are added together. The spectral width is 25,000 Hz with a minimum file size of 32K data points. The samples are analyzed at 130° C. in a 10 mm broad band probe. The comonomer incorporation is determined using Randall's triad method (Randall, J. C.; JMS-Rev. Macromol. Chem. Phys., C29, 201-317 (1989), which is incorporated by reference herein in its entirety.

Density

The density of polymers may be measured by preparing the samples according to ASTM D 1928 and then measuring density within one hour of sample pressing according to ASTM D792, Method B.

Melt Index

Melt index, $I_2$ or MI, was measured in accordance with ASTM D 1238, Condition 190° C./2.16 kg.

DSC Standard Method for Polymers.

Differential Scanning calorimetry results were determined using a TAI model Q1000 DSC equipped with an RCS cooling accessory and an autosampler. A nitrogen purge gas flow of 50 ml/min was used. The sample was pressed into a thin film and melted in the press at about 175° C. and then air-cooled to room temperature (25° C.). The sample (~3-10 mg) was then cut into a 6 mm diameter disk, accurately weighed, placed in a light aluminum pan (~50 mg), and then crimped shut. The thermal behavior of the sample was investigated with the following temperature profile. The sample was rapidly heated to 180° C. and held isothermal for 3 minutes in order to remove any previous thermal history. The sample was then cooled to −90° C. at 10° C./min cooling rate and held at −90° C. for 3 minutes. The sample was then heated to 150° C. at 10° C./minute heating rate. The cooling and second heating curves were recorded. The melting peak ($T_m$) and cooling peak ($T_c$) were determined with respect to a linear baseline.

For the polymer examples, the DSC melting peak temperature (from the endotherm) is measured as the maximum in heat flow rate (W/g) with respect to the linear baseline drawn between −30° C. and end of melting. The DSC crystallization peak temperature (from the exotherm) is measured as the maximum in heat flow rate (W/g) with respect to the linear baseline drawn between −30° C. and end of melting. The heat of fusion is measured as the area under the melting curve between −30° C. and the end of melting using a linear baseline.

The total weight percent crystallinity is equal to 100*enthalpy of sample/enthalpy of polyethylene crystal where the enthalpy of a perfect polyethylene crystal is equal to 292 J/g as reported in Macromolelcular Physics, Vol. 1, Academic Press, New York, 1973, p. 154.

GPC (Mw/Mn Determination)

The gel permeation chromatographic system can be either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, J. Polym. Sci., Polym. Let., 6, 621 (1968)): $M_{polyethylene} = 0.431(M_{polystyrene})$.

Polyethylene equivalent molecular weight calculations are performed using Viscotek TriSEC software Version 3.0.

Brookfield Viscosity

Melt viscosity was measured using a Brookfield Viscometer Model DV-II equipped with a Brookfield Thermosel™ System. Melt viscosity of the adhesive example is determined in accordance to ASTM D1084 measured at 177° C. using spindle 31.

Dynamic (Complex) Viscosity Temperature Sweep Method

The viscosity is measured using a TA instruments ARES strain-controlled rheometer. A rotary actuator (servomotor) applies shear deformation in the form of strain to a sample. In response, the sample generated torque is measured by a force transducer. The viscoelastic properties of the sample are measured in the melt using a 25 mm parallel plate set up. The analysis is performed on a 25 mm compression molded disk with a starting thickness of 3 mm and then the plate gap is reduced to a value between 1.5 to 2 mm before the excess sample is trimmed. The complex viscosity of the sample is determined using Rheometrics Orchestrator software (v. 6.5.8). The data is recorded at a constant strain value between 5 to 10% and a constant frequency of 10 rad/s while cooling at a rate of 10° C./min. The temperature sweeps are performed from 150 to 30° C. The cross-over temperature is the temperature at which the viscosity rises above 500 pa-s.

EXAMPLES

Tables 1 and 2 show the composition and properties of the OBCs used in the formulations.

TABLE 1

Composition of OBCs

| OBC Resin | Density (g/cc) | MI (g/10 min) | Total wt % Crystallinity | Total Mol % Octene | Mol % Octene in Soft Segment | Mol % Octene in the Hard Segment | wt % Hard Segment |
|---|---|---|---|---|---|---|---|
| A | 0.884 | 37 | 26 | 10 | 11 | 0.46 | 7 |
| 1 | 0.877 | 30 | 17 | 8 | 12 | 3.0 | 35 |

TABLE 2

Properties of OBCs

| OBC Resin | Density (g/cc) | Mw (g/mol) | Mw/Mn | MI (g/10 min) | Tm (° C.) | Tc (° C.) |
|---|---|---|---|---|---|---|
| A | 0.884 | 48,720 | 2.27 | 37 | 120 | 105 |
| 1 | 0.877 | 45,620 | 2.29 | 30 | 93 | 72 |

Figure 2:
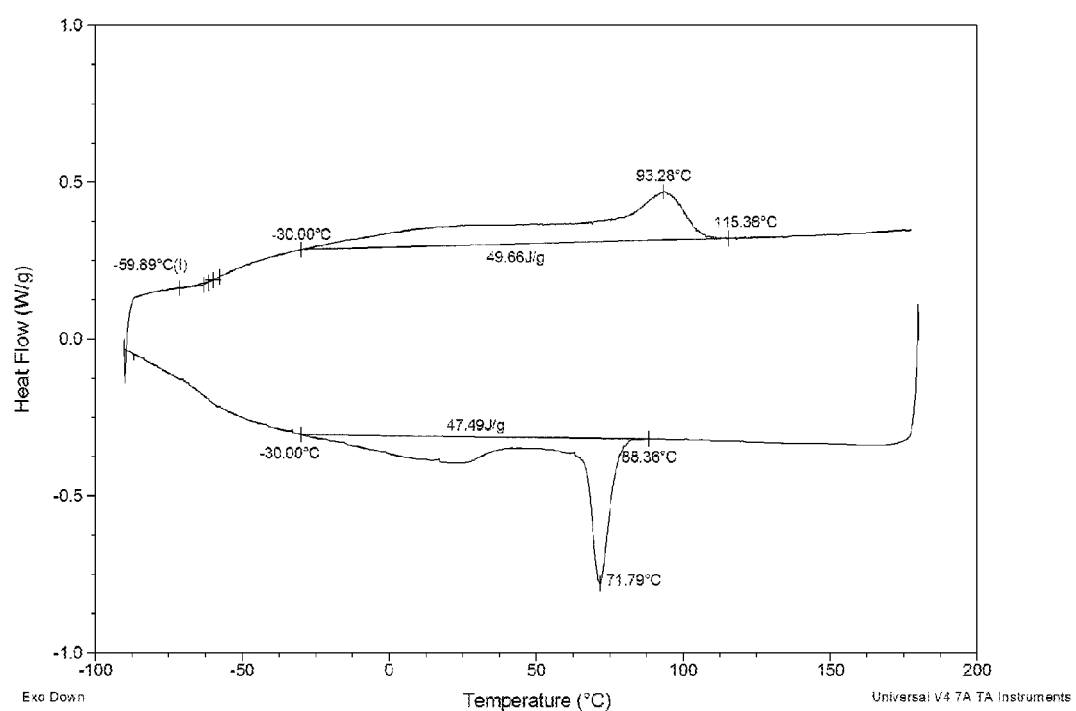
FIG. 2 shows the DSC profile of OBC 1.
Figure 3:
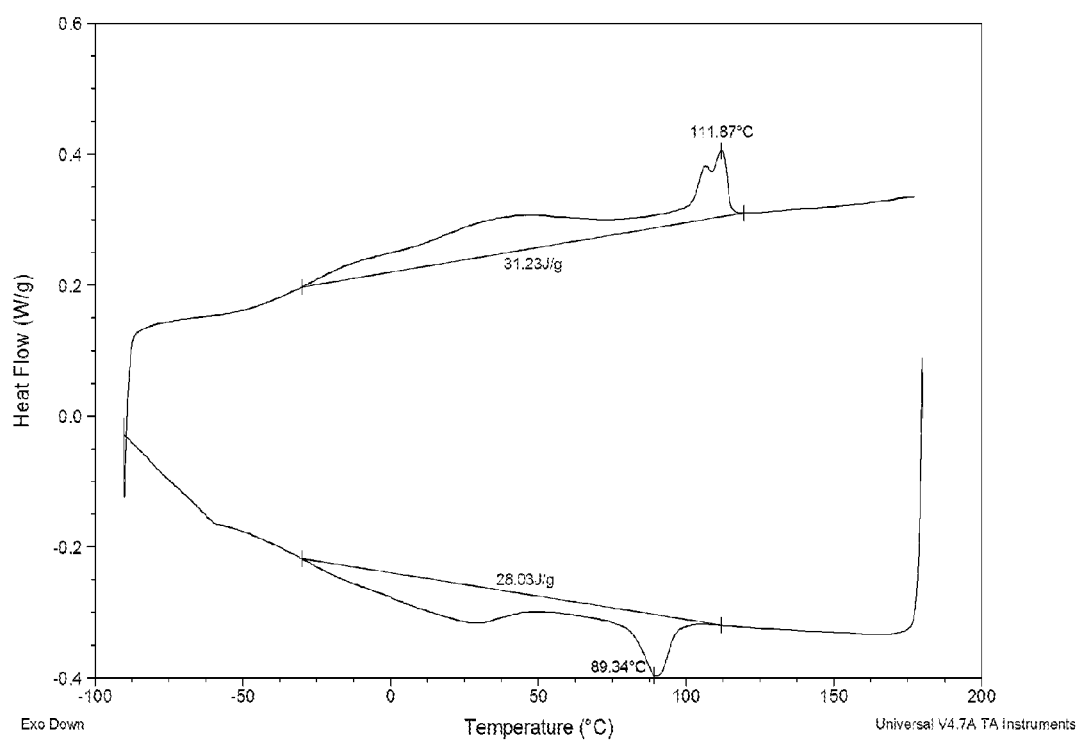
FIG. 3 shows the DSC profile of Formulation A.
Figure 4:
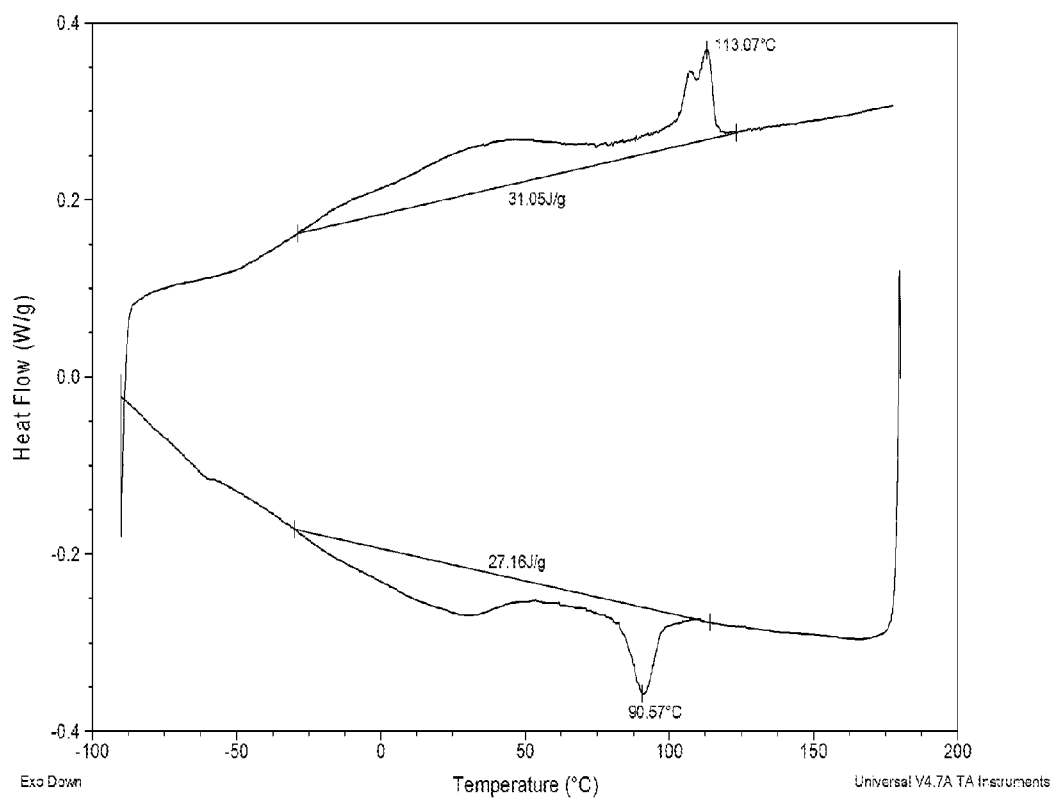
FIG. 4 shows the DSC profile of Formulation B.
Figure 5:
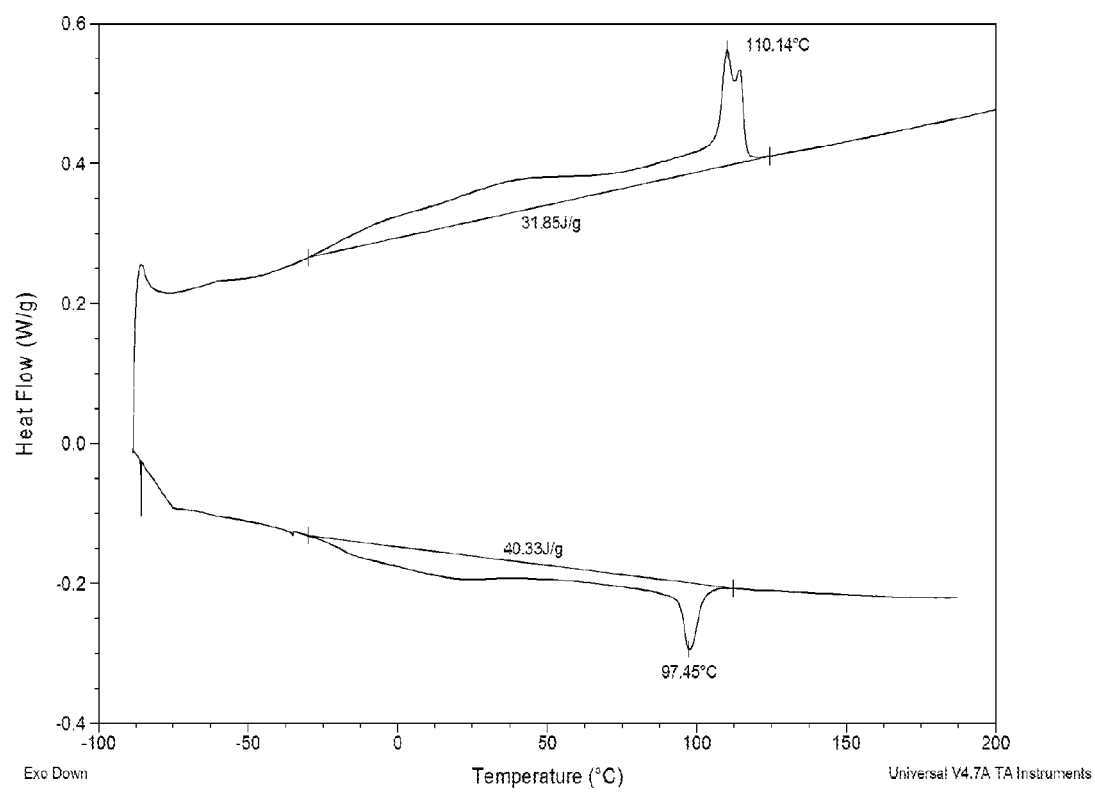
FIG. 5 shows the DSC profile of Formulation C.
Figure 6:
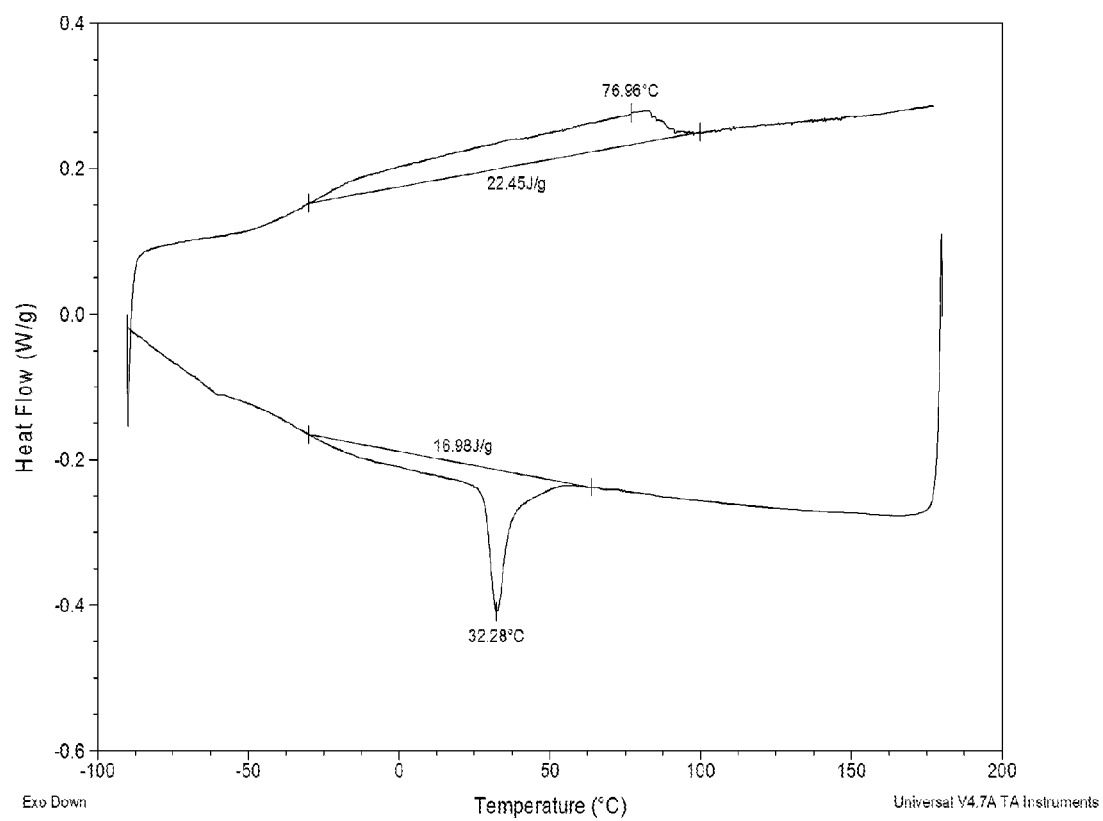
FIG. 6 shows the DSC profile of Formulation 1.
Figure 7:
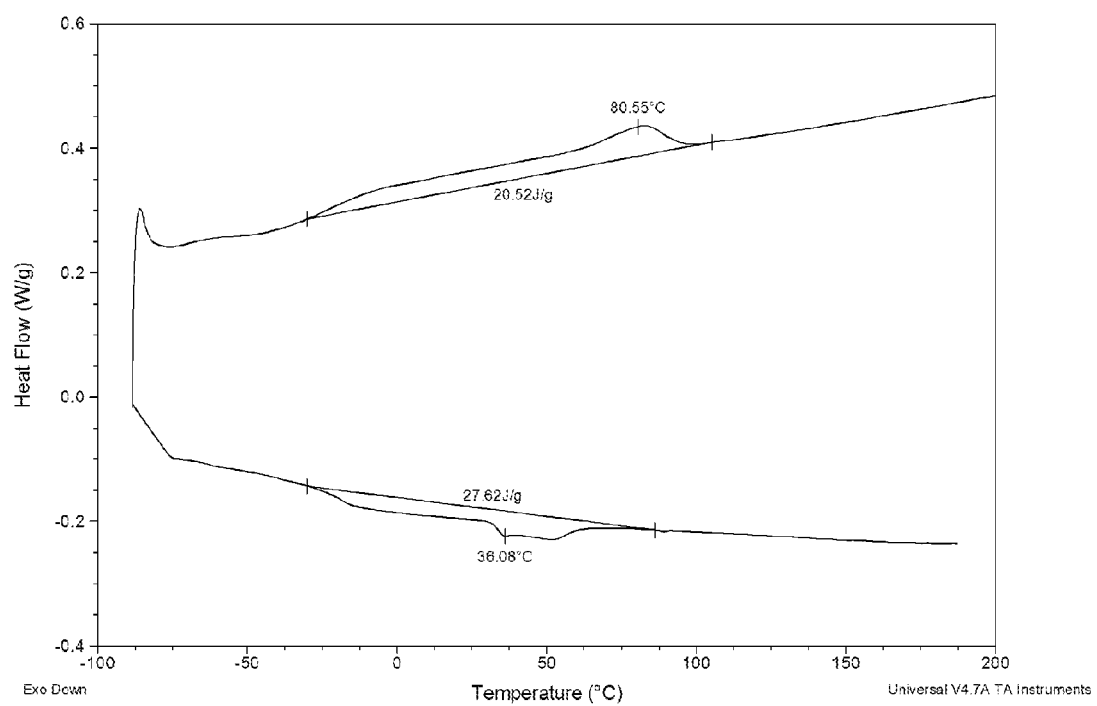
FIG. 7 shows the DSC profile of Formulation 2.

FIGS. 1 and 2 show the DSC profiles of OBC A and OBC 1 respectively.

TABLE 3

Additional Components of Adhesive Formulations

| | |
|---|---|
| PO | AFFINITY ™ GA 1900 Polyolefin Plastomer; density 0.870 g/cm³; (The Dow Chemical Company) |
| Tackifier 1 | Escorez ™ 5400; softening point 100° C. (Exxon-Mobil Chemical Company) |
| Tackifier 2 | Regalite ™ R1090; softening point 90° C. (Eastman Chemical Company) |
| Oil | Kaydol ™ Oil (Sonneborn) |
| Anti-oxidant | Irganox ™ 1010 5% (BASF) |

Adhesives were formulated and tested according to the formulations listed in Table 4 below. Formulations A, B and C are comparative formulations and Formulations 1 and 2 are inventive.

FIGS. 3-7 compare the DSC profiles of the Comparative Formulations A-C, and the inventive Formulations 1 and 2, respectively. As shown, an adhesive based on the inventive OBC 1 with the medium melting point hard segment (93° C.) results in a lower crystallization temperature than the adhesives based on the comparative OBC. The 50° C. difference in crystallization temperature between the comparative examples and the inventive examples shows a significant delay in its crystallization which can lead to longer open times in a formulated adhesive. The lack of significant difference between the Comparative Formulations suggests that the polymer dominates the setup of the adhesive; Comparative Formulation B contains a lower softening point tackifier (90° C.) than Comparative Formulation A (100° C.).

Figure 8:
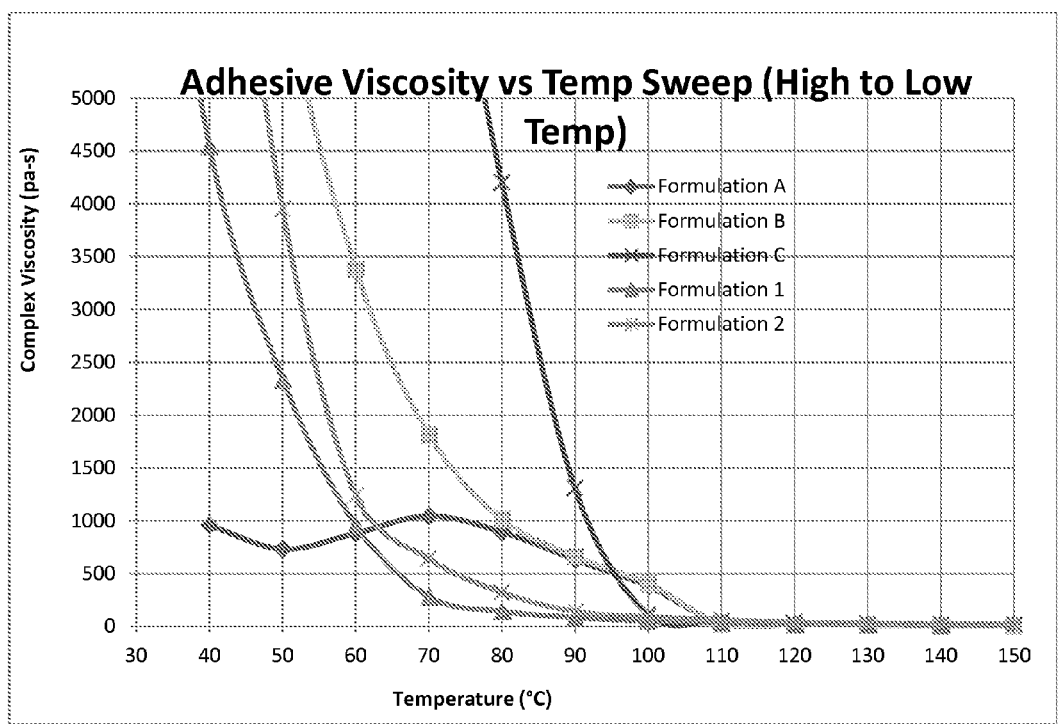
FIG. 8 shows the viscosity setup plots for Formulations A, B and C as well as for Formulations 1 and 2.

Table 5 shows the data for FIG. 8 which is the Complex Viscosity of the formulations plotted against temperature from 30° C. to 150° C.

TABLE 5

Adhesive Formulation Viscosity Temperature Sweep High to Low

| | Formulation | | | | |
|---|---|---|---|---|---|
| ° C. | A Pa-s | B Pa-s | C Pa-s | 1 Pa-s | 2 Pa-s |
| 150 | 6.7 | 4.9 | 18.0 | 8.3 | 19.0 |
| 140 | 9.0 | 6.8 | 20.8 | 11.4 | 22.2 |
| 130 | 12.2 | 9.6 | 27.9 | 15.9 | 29.7 |
| 120 | 16.8 | 13.8 | 39.3 | 22.6 | 41.7 |
| 110 | 27.7 | 26.8 | 57.3 | 33.3 | 60.9 |

TABLE 4

Adhesive formulations by weight and by % weight basis respectively

| | Component by weight in grams | | | | | Component Weight % Basis | | | | |
|---|---|---|---|---|---|---|---|---|---|---|
| | Formulation A | Formulation B | Formulation C | Formulation 1 | Formulation 2 | Formulation A | Formulation B | Formulation C | Formulation 1 | Formulation 2 |
| OBC A | 15.75 | 15.75 | 22.5 | — | — | 21.0% | 21.0% | 30.0% | — | — |
| OBC 1 | — | — | — | 15.75 | 22.5 | — | — | — | 21.0% | 30% |
| PO | 6.75 | 6.75 | — | 6.75 | — | 9.0% | 9.0% | — | 9.0% | — |
| Tackifier 1 | 37.5 | — | 37.5 | 37.5 | 37.5 | 50.0% | — | 50.0% | 50.0% | 50.0% |
| Tackifier 2 | — | 37.5 | — | — | — | — | 50.0% | — | — | — |
| Oil | 15.0 | 15.0 | 15.0 | 15.0 | 15.0 | 20.0% | 20.0% | 20.0% | 20.0% | 20.0% |
| Anti-oxidant | 0.15 | 0.15 | 0.15 | 0.15 | 0.15 | 0.2% | 0.2% | 0.2% | 0.2% | 0.2% |
| Total Weight | 75.15 | 75.15 | 75.15 | 75.15 | 75.15 | 100.2% | 100.2% | 100.2% | 100.2% | 100.2% |

TABLE 5-continued

Adhesive Formulation Viscosity Temperature Sweep High to Low

| | Formulation | | | | |
|---|---|---|---|---|---|
| °C. | A Pa-s | B Pa-s | C Pa-s | 1 Pa-s | 2 Pa-s |
| 100 | 377.9 | 404.8 | 114.6 | 51.3 | 92.0 |
| 90 | 628.1 | 663.9 | 1312.3 | 82.7 | 139.6 |
| 80 | 891.8 | 1017.5 | 4204.5 | 141.7 | 321.5 |
| 70 | 1045.9 | 1814.4 | 7853.9 | 278.2 | 640.7 |
| 60 | 882.3 | 3384.3 | 12263.3 | 954.6 | 1242.3 |
| 50 | 731.8 | 6284.4 | 18569.4 | 2330.2 | 3956.3 |
| 40 | 956.2 | 12590.5 | 41562.1 | 4544.0 | 8960.4 |
| 30 | | 22309.6 | 92893.1 | 8846.1 | 15033.5 |

As may be seen from the data in Table 4 and the plot in FIG. 8, the cross-over temperature for the Comparative Formulations occurs by 95° C. and for the Inventive Formulations occurs by 75° C.

TABLE 6

Brookfield Viscosity of the Formulations

| Formulation | A | B | C | 1 | 2 |
|---|---|---|---|---|---|
| Brookfield Viscosity @177 (mPa-s) | 4789 | 2439 | 6347 | 4049 | 6622 |
| Tm (° C.) | 111.9 | 113.1 | 110.1 | 77.0 | 80.5 |
| Tc (° C.) | 89.3 | 90.6 | 97.5 | 32.3 | 36.1 |

What is claimed is:

1. Adhesive composition comprising:
   a. olefin block copolymer comprising ethylene and an alpha-olefin comonomer, wherein the olefin block copolymer comprises:
      1) hard blocks, wherein the hard blocks comprise 1-8 mol % comonomer; and
      wherein the hard blocks are present in an amount of 20 wt %-45 wt %, by weight of the olefin block copolymer;
      2) soft blocks, wherein the soft blocks comprise 10-14 mol % comonomer; and
      wherein the olefin block copolymer has a Mw of 15,000 g/mol-100,000 g/mol, a total crystallinity of 5 wt %-30 wt %, a Tm of 60° C. to 105° C., and, a Tc of 45° C. to 100° C.,
   b. tackifier; and,
   c. oil.

2. Adhesive composition of claim 1 further comprising an additional polyolefin.

3. Adhesive composition of claim 1 wherein the olefin block copolymer comprises from 50 mol % to 98 mol % ethylene.

4. Adhesive composition of claim 1 having a Complex Viscosity in the temperature range of 70° C. to 110° C. of from 0 pa-s to 500 pa-s.

5. Adhesive composition of claim 1, wherein:
   the hard blocks are present in an amount of 30 wt % to 40 wt %, by weight of the olefin block copolymer, and
   the olefin block copolymer has a total crystallinity of 15 wt % to 20 wt %, a Tm of 90° C. to 105° C., and a Tc of 70° C. to 80° C.

6. Adhesive composition of claim 5, wherein:
   the comonomer is octene,
   the hard blocks comprise 2 mol % to 4 mol % octene, and
   the soft blocks comprise 10 mol % to 13 mol % octene.

7. Adhesive composition of claim 6, wherein:
   the amount of the tackifier is 30 wt % to 70 wt % based on the total weight of the composition, and
   the amount of the oil is 10 wt % to 40 wt % based on the total weight of the composition.

* * * * *